United States Patent [19]
Cain

[11] Patent Number: 6,055,046
[45] Date of Patent: Apr. 25, 2000

[54] SYSTEM AND METHOD FOR ALIGNING A LASER TRANSMITTER

[75] Inventor: Gary Lynn Cain, Springfield, Ohio

[73] Assignee: Spectra Precision, Inc., Dayton, Ohio

[21] Appl. No.: 09/241,233

[22] Filed: Feb. 1, 1999

[51] Int. Cl.$^7$ .................................................. G01B 11/26
[52] U.S. Cl. .......................................... 356/141.1; 33/291
[58] Field of Search ..................................... 356/399, 400, 356/401, 141.1–141.5, 153, 139, 140, 138, 247, 251–255; 33/291, 290, 292, 286; 250/559.23, 559.3, 559.31

[56] References Cited

U.S. PATENT DOCUMENTS

5,852,493  12/1998  Monnin .

*Primary Examiner*—Frank G. Font
*Assistant Examiner*—Tu T. Nguyen
*Attorney, Agent, or Firm*—Killworth, Gottman, Hagan & Schaeff LLP

[57] ABSTRACT

A laser transmitter includes an optical system arranged to generate laser beam and configured to project the laser beam radially so as to define a plane through which the laser beam is projected. A positioning device is coupled to the laser transmitter for adjusting an angular orientation of the optical system with respect to a first axis and with respect to a second axis. The angular orientation of the laser transmitter is adjusted so that the plane through which the laser beam is projected has a first slope with respect to the first axis and a second slope with respect to the second axis. A rotary encoder is arranged to determine a rotary position of the laser beam as it rotates to define the plane. A target is positioned in an alignment direction corresponding to the direction to which the laser transmitter is to be aligned. The laser transmitter may be aligned with respect to the first axis, the second axis or some other reference. A processor, in conjunction with a detector, determines the alignment direction. Once the alignment direction is determined, the processor calculates a first calculated slope and a second calculated slope and causes the positioning device to adjust the angular orientation of the optical system accordingly so that the plane through which the laser beam is projected corresponds to the first slope and the second slope in the alignment direction.

65 Claims, 8 Drawing Sheets

SYSTEM AND METHOD FOR ALIGNING A LASER TRANSMITTER

BACKGROUND OF THE INVENTION

The present invention relates in general to a laser transmitter, and, more particularly, to a system and method for aligning a laser transmitter so that a laser beam projected by the laser transmitter defines a plane having desired slopes in a desired direction.

Laser light systems have been employed in numerous surveying and construction applications. In one type of system, a laser light transmitting device provides a rotating laser beam which establishes a reference plane. Typically, the rotating laser beam is used to provide a continuous plane of light that creates either a constant horizontal bench mark of elevation or a selected plane over an entire work area. The laser light is either detected by the naked eye or by one or more laser beam detectors, placed at considerable distances from the transmitting device. Various construction tasks may be performed based on the visual perception of the laser light. Alternatively, detectors may be used to intercept the rotating laser beam and determine a proper elevation and grade at selected points throughout the work area.

In one type of laser light transmitting device, the plane of light is produced by projecting the beam generally upward and then deflecting the beam ninety degrees with a pentaprism or penta-mirror assembly. The pentaprism assembly is rotated about a vertical axis, thus rotating the beam and defining the reference plane. The plane of light may be tilted to a desired slope along with one or more axes by offsetting the laser light transmitting device with respect to a generally horizontal plane. The laser light transmitting device must be properly aligned about one of the axes so that the laser light accurately defines the reference plane with the desired slope.

Typically, the laser transmitting device is aligned by positioning the device so that alignment grooves located on the top of the device point in the desired direction of the slope. Alternatively, a telescope mounted on the top of the device may be used in place of the grooves to provide another visual means for aligning the transmitting device in the desired direction of the slope. Both mechanisms for aligning the transmitting device require a number of field iterations to properly align the transmitting device. Further, both mechanisms for aligning the transmitting device are inaccurate considering that an offset of a couple of degrees results in relatively large error over the entire work site.

Accordingly, there is a need for a system for aligning a laser transmitter so that a laser beam projected from the laser transmitter accurately defines a plane with a desired slope. Preferably, such a system would be automatic, easy to operate and relatively inexpensive.

SUMMARY OF THE INVENTION

The present invention meets this need by providing a system and method for aligning a laser transmitter accurately. The laser transmitter includes an optical system arranged to generate a laser beam and configured to project the laser beam radially so as to define a plane through which the laser beam is projected. A positioning device is coupled to the laser transmitter for adjusting an angular orientation of the optical system with respect to a first axis and with respect to a second axis. The angular orientation of the laser transmitter is adjusted so that the plane through which the laser beam is projected has a first slope with respect to the first axis and a second slope with respect to the second axis. A rotary encoder is arranged to determine a rotary position of the laser beam as it rotates to define the plane. A target is positioned in an alignment direction corresponding to the direction to which the laser transmitter is to be aligned. The laser transmitter may be aligned with respect to the first axis, the second axis or some other reference. A processor, in conjunction with a detector, determines the alignment direction. Once the alignment direction is determined, the processor calculates a first calculated slope and a second calculated slope and causes the positioning device to adjust the angular orientation of the optical system accordingly so that the plane through which the laser beam is projected corresponds to the first slope and the second slope in the alignment direction.

According to a first aspect of the present invention, a laser transmitter comprises an optical system, a positioning device, an input device, a rotary encoder, a detector and a processor. The optical system is arranged to generate a laser beam and project it radially along a rotational arc defined about a central rotational axis, thereby defining a plane through which the laser beam is projected. The positioning device is coupled to the optical system for adjusting an angular orientation of the optical system with respect to a first axis and with respect to a second axis. The input device generates an input signal representative of a first slope of the laser beam with respect to the first axis and a second slope of the laser beam with respect to the second axis. The rotary encoder is arranged to produce a rotary signal indicative of a rotary position of the laser beam relative to the rotational arc. The detector is arranged to generate a detector signal indicative of reception of the laser beam. The processor is adapted to receive the input signal, the rotary signal and the detector signal. The processor is also programmed to determine an alignment direction with respect to one of the first axis and the second axis about which the first slope and the second slope are to be aligned in response to the detector signal and the rotary signal, calculate a first calculated slope and a second calculated slope based on the alignment direction, the first slope and the second slope so that the plane through which the laser beam is projected corresponds to the first slope and the second slope in the alignment direction, and control the positioning device in response to the first calculated slope and the second calculated slope so that the plane through the laser beam is projected corresponds to the first slope and the second slope in the alignment direction.

The detector may comprise a photodetecting system receiving a reflected laser beam based on the laser beam projected in the alignment direction or an electromagnetic receiver receiving an electromagnetic wave indicating reception of the laser beam projected in the alignment direction. The photodetecting system may comprise a photodetector positioned within the optical system or coupled to an outer portion of the laser transmitter.

Preferably, the rotary encoder comprises a read head and a rotary disk having an index mark and a plurality of reference marks with the index mark and the read head being aligned so that when the index mark is detected by the read head, the laser beam is projected in a projection direction substantially parallel to and aligned with the first axis. The rotary encoder may comprise an absolute rotary encoder. Alternatively, the rotary encoder may comprise a read head, a rotary disk having a plurality of reference marks and a reference photocell with the reference photocell being aligned with the first axis thereby providing an indication of the first axis when the laser beam traverses the reference photocell. Preferably, the reference photocell includes a first position in a path of the laser beam and a second position out of the path of the laser beam. In another aspect of the present invention, the rotary encoder comprises a read head and a rotary disk having a plurality of holes.

The processor may be further programmed to determine an angle θ between the first axis and the alignment direction in response to the rotary signal and the detector signal. Preferably, the processor is further programmed to determine an angle φ between the first axis and an equivalent first axis based on the alignment direction so as to provide a detection window of preferably ±30° to identify the intended axis. The angle φ is determined as follows:

$$\phi = \theta \text{ if } 330° \leq \theta \leq 30°,$$
$$\phi = \theta - 90° \text{ if } 60° \leq \theta \leq 120°,$$
$$\phi = \theta - 180° \text{ if } 150° \leq \theta \leq 210°, \text{ and}$$
$$\phi = \theta - 270° \text{ if } 240° \leq \theta \leq 330°.$$

The processor is preferably programmed to calculate the first calculated slope and the second calculated slope using the following equations:

$$m = m' \cos(\phi) - n' \sin(\phi),$$

and $$n = n' \cos(\phi) + m' \sin(\phi),$$

where:
  m is the first calculated slope,
  n is the second calculated slope,
  m' is the first slope,
  n' is the second slope, and
  φ is the angle between the first axis and the equivalent first axis.

The first slope may be a compound slope with the alignment direction being the direction of the compound slope. The positioning device may comprise a first positioning system for adjusting the angular orientation of the optical system with respect to the first axis and a second positioning system for adjusting the angular orientation of the optical system with respect to the second axis. The processor may be further programmed to provide an indication that the alignment direction has been determined. Preferably, the processor is programmed to turn the laser beam off momentarily to provide the indication. The first axis may comprise a positive first axis and a negative first axis while the second axis may comprise a positive second axis and a negative second axis. Preferably, the first axis is substantially orthogonal to the second axis. The processor may be further programmed to determine the alignment direction based on an average of readings of the rotary signal from the rotary encoder for increased accuracy.

According to another embodiment of the present invention, a laser transmitting system comprises an optical system, a positioning device, an input device, a rotary encoder, a target, a detector and a processor. The optical system is arranged to generate a laser beam and project it radially along a rotational arc defined about a central rotational axis thereby defining a plane through which the laser beam is projected. The positioning device is coupled to the optical system for adjusting an angular orientation of the optical system with respect to a first axis and with respect to a second axis. The input device generates an input signal representative of a first slope of the laser beam with respect to the first axis and a second slope of the laser beam with respect to the second axis. The rotary encoder is arranged to produce a rotary signal indicative of a rotary position of the laser beam relative to the rotational arc. The target is positioned in an alignment direction. The detector is arranged to generate a detector signal indicative of reception of the laser beam by the target. The processor is adapted to receive the input signal, the rotary signal and the detector signal and programmed to determine the alignment direction with respect to one of the first axis and the second axis about which the first slope and the second slope are to be aligned in response to the detector signal and the rotary signal, calculate a first calculated slope and a second calculated slope based on the alignment direction, the first slope and the second slope so that the plane through which the laser beam is projected corresponds to the first slope and the second slope in the alignment direction, and control the positioning device in response to the first calculated slope and the second calculated slope so that the plane through the laser beam is projected corresponds to the first slope and the second slope in the alignment direction.

Preferably, the detector comprises a photodetecting system and the target comprises a retroreflector with the photodetecting system receiving a reflected laser beam from the target. Alternatively, the detector may comprise an electromagnetic receiver and the target may comprise a photocell and an electromagnetic transmitter transmitting an electromagnetic wave to the electromagnetic receiver upon detection of the laser beam by the photocell indicating reception of the laser beam projected in the alignment direction. The photodetecting system may comprise a photodetector positioned within the optical system or coupled to an outer portion of the laser transmitter.

The rotary encoder may comprise a read head and a rotary disk having an index mark and a plurality of reference marks with the index mark and the read head being aligned so that when the index mark is detected by the read head, the laser beam is projected in a projection direction substantially parallel to and aligned with the first axis. The rotary encoder may comprise an absolute rotary encoder. Alternatively, the rotary encoder may comprise a read head, a rotary disk having a plurality of reference marks and a reference photocell with the reference photocell being aligned with the first axis thereby providing an indication of the first axis when the laser beam traverses the reference photocell. Preferably, the reference photocell includes a first position in a path of the laser beam and a second position out of the path of the laser beam. In another aspect of the present invention, the rotary encoder comprises a read head and a rotary disk having a plurality of holes.

Preferably, the processor is further programmed to determine an angle θ between the first axis and the alignment direction in response to the rotary signal and the detector signal. The processor may be further programmed to determine an angle φ between the first axis and an equivalent first axis based on the alignment direction so as to provide a detection window of preferably ±30° to identify the intended axis. The angle φ is determined as follows:

$$\phi = \theta \text{ if } 330° \leq \theta \leq 30°,$$
$$\phi = \theta - 90° \text{ if } 60° \leq \theta \leq 120°,$$
$$\phi = \theta - 180° \text{ if } 150° \leq \theta \leq 210°, \text{ and}$$
$$\phi = \theta - 270° \text{ if } 240° \leq \theta \leq 330°.$$

The processor is preferably programmed to calculate the first calculated slope and the second calculated slope using the following equations:

$$m = m' \cos(\phi) - n' \sin(\phi),$$

and $$n=n' \cos(\phi)+m' \sin(\phi),$$

where:
- m is the first calculated slope,
- n is the second calculated slope,
- m' is the first slope,
- n' is the second slope, and
- φ is the angle between the first axis and the equivalent first axis.

The first slope may be a compound slope with the alignment direction being a direction of the compound slope. The positioning device may comprise a first positioning system for adjusting the angular orientation of the optical system with respect to the first axis and a second positioning system for adjusting the angular orientation of the optical system with respect to the second axis. The processor may be further programmed to provide an indication that the alignment direction has been determined. Preferably, the processor is programmed to turn the laser beam off momentarily to provide the indication. The first axis may comprise a positive first axis and a negative first axis while the second axis may comprise a positive second axis and a negative second axis. Preferably, the first axis is substantially orthogonal to the second axis. The processor is also preferably programmed to determine the alignment direction based on an average of readings of the rotary signal from the rotary encoder.

According to yet another aspect of the present invention, a method of projecting a laser beam in a plane having a first slope with respect to a first axis and a second slope with respect to a second axis is provided. The laser beam is projected from a laser source such that it rotates along a rotational arc defined about a central rotational axis and sweeps across a target positioned in an alignment direction. The alignment direction is determined with respect to one of the first axis and the second axis. A first calculated slope and a second calculated slope are calculated based on the alignment direction, the first slope and the second slope. The first calculated slope corresponds to the first slope in the alignment direction and the second calculated slope corresponds to the second slope in the alignment direction. The laser source is positioned at the first calculated slope with respect to the first axis and the second calculated slope with respect to the second axis so that the rotating laser beam defines the plane corresponding to the first slope and the second slope in the alignment direction.

The step of determining the alignment direction with respect to one of the first axis and the second axis may comprise the step of detecting a reflected laser beam from the target. The step of determining the alignment direction with respect to one of the first axis and the second axis may comprise the step of using a rotary encoder to determine the alignment direction in response to the reflected laser beam. The rotary encoder may comprise an absolute rotary encoder. Alternatively, the rotary encoder may comprise a read head and a rotary disk having an index mark and a plurality of reference marks with the index mark and the read head being aligned so that when the index mark is detected by the read head, the laser beam is projected in a projection direction substantially parallel to the first axis. In another aspect of the present invention, the rotary encoder may comprise a read head, a rotary disk having a plurality of reference marks and a reference photocell with the reference photocell being aligned with the first axis to thereby provide an indication of the first axis when the laser beam traverses the reference photocell. Preferably, the reference photocell includes a first position in a path of the laser beam and a second position out of the path of the laser beam. In yet another aspect of the present invention, the rotary encoder may comprise a read head and a rotary disk having a plurality of holes.

The step of determining the alignment direction with respect to one of the first axis and the second axis may comprise the step of transmitting an electromagnetic wave from the target to the laser source thereby indicating detection of the laser beam in the alignment direction. The step of determining the alignment direction with respect to one of the first axis and the second axis may comprise the step of using a rotary encoder to determine the alignment direction in response to the electromagnetic wave.

The step of calculating a first calculated slope and a second calculated slope based on the alignment direction, the first slope and the second slope may comprise the step of determining an angle θ between the first axis and the alignment direction. The step of calculating a first calculated slope and a second calculated slope based on the alignment direction, the first slope and the second slope may comprise the step of determining an angle φ between the first axis and an equivalent first axis based on the alignment direction so as to provide a detection window of preferably ±30° to identify the intended axis. The angle φ is determined as follows:

$$\phi = \theta \text{ if } 330° \leq \theta \leq 30°,$$
$$\phi = \theta - 90° \text{ if } 60° \leq \theta \leq 120°,$$
$$\phi = \theta - 180° \text{ if } 150° \leq \theta \leq 210°, \text{ and}$$
$$\phi = \theta - 270° \text{ if } 240° \leq \theta \leq 330°.$$

The step of calculating a first calculated slope and a second calculated slope based on the alignment direction, the first slope and the second slope may comprise the step of calculating the first calculated slope and the second calculated slope using the following equations:
ti $m=m' \cos(\phi)-n' \sin(\phi),$ and $$n=n' \cos(\phi)+m' \sin(\phi)$$

where
- m is the first calculated slope,
- n is the second calculated slope,
- m' is the first slope,
- n' is the second slope, and
- φ is the angle between the first axis and the equivalent first axis.

The first slope may be a compound slope with the alignment direction being a direction of the compound slope. The method may further comprise the step of providing an indication that the alignment direction has been determined. The step of providing an indication that the alignment direction has been determined may comprise the step of turning the laser beam off momentarily. The first axis may comprise a positive first axis and a negative first axis, and the second axis may comprise a positive second axis and a negative second axis. Preferably, the first axis is substantially orthogonal to the second axis. The step of determining the alignment direction with respect to one of the first axis and the second axis may be performed a plurality of times with the results being averaged.

Accordingly, it is an object of the present invention to provide a system and method for aligning a laser transmitter so that a laser beam projected from the laser transmitter defines a plane with a desired slope accurately. It is another object of the present invention to provide such a system that is automatic, easy to operate and relatively inexpensive.

Other features and advantages of the invention will be apparent from the following description, the accompanying drawings and the appended claims.

DETAILED DESCRIPTION OF THE INVENTION

While the present invention is applicable in general to laser transmitters, it will be described herein with reference to a laser transmitter 10 illustrated in FIG. 1. The laser transmitter 10 includes a base 12, an optical system 14, an input device 15, a positioning device 16, a detector 17 and a processor 19. The optical system 14 comprises a light source 18, an optical assembly 20 and an optical projecting device 22. The optical assembly 20 includes a frame 24 and a gimbal mechanism 26. The positioning device 16 comprises a first positioning device 28 and a second positioning device 30. The laser transmitter 10 may also comprise a cover 31 to enclose and protect the internal components of the transmitter.

The light source 18 is coupled to the frame 24 and generates a beam of laser light 32. In the illustrated embodiment, the light source 18 is a laser diode which generates the beam of laser light 32. It will be appreciated by those skilled in the art that other laser sources may be used to generate the beam of laser light 32. A collection lens 34 is coupled to the frame 24 and positioned above the light source 18 so as to collect the laser beam 32 and project it in the first direction 35 along a substantially vertical axis or projection axis 37. Preferably, the collection lens 34 is a planar convex lens which collimates the laser beam 32. The optical system 14 may comprise addition components, such as a steering window, to ensure that the laser beam 32 is projected along the projection axis 37 as desired.

The optical projecting device 22 is coupled to the frame 24 and includes a motor 36 and a pentaprism 38 within the spindle 40. The optical projecting device 22 is positioned to deflect the laser beam 32 ninety degrees with respect to vertical. The pentaprism 38 is a structure which deflects incoming light at a ninety-degree angle with respect to the direction of the incoming light, within limits, regardless of the precise orientation of the pentaprism 38. Consequently, the incoming light does not have to hit the pentaprism 38 at an exact location to be deflected ninety degrees.

The pentaprism 38 is rotated within the spindle 40 by the motor 36 at a speed of approximately 600 rpm to define a plane of light. The laser beam 32 is rotated along a rotational arc defined about a central rotational axis 42. The central rotational axis 42 corresponds to the center of rotation of the pentaprism 38. The rotational arc is preferably 360 degrees. However, it will be appreciated by those skilled in the art that the laser beam 32 may be dithered back and forth so as to define a rotational arc less than 360 degrees. A speed of 600 rpm is well suited for machine control applications of the laser beam 32. However, as will be appreciated by those skilled in the art the pentaprism 38 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used. While the laser transmitter 10 has been described with the laser beam 32 being transmitted upwards, it will be appreciated by those skilled in the art that optical components may be shifted appropriately so that the laser beam 32 is transmitted downwards, with the optical projecting device 22 being the lower most component and the light source 18 being the upper most component. The laser beam 32 is projected in a projection direction 43 as it emerges from the pentaprism 38.

The frame 24 is coupled to a first portion 26A of the gimbal mechanism 26 through a second or Y-axis pivot 56. The first portion 26A is coupled to a second portion 26B of the gimbal mechanism 26 through a first or X-axis pivot 54. In the illustrated embodiment, the first and second axes are substantially orthogonal to each other and correspond to the X and Y axes, respectively, of a standard X-Y coordinate system as illustrated in FIG. 1. It will be appreciated by those skilled in the art that the first and second axes do not have to be substantially orthogonal to each other. While the X and Y axes are normally fixed, the defined X and Y actually rotate with the laser transmitter 10 in the X-Y plane. For ease of description, the first and second axes will be referenced as the X and Y axes, respectively, hereafter. The second portion 26B of the gimbal mechanism 26 is coupled to the base 12 so that the frame 24 is suspended by the gimbal mechanism 26. Since the frame 24 is suspended from the gimbal mechanism 26, the frame 24 pivots about the X and Y axes via the X and Y axes leveling pivots 54, 56, respectively. The angular orientation of the frame 24 with respect to the X and Y axes, and hence the laser beam 32, is dependent on the orientation of the first portion 26A with respect to the second portion 26B of the gimbal mechanism 26, and the orientation of the frame 24 with respect to the first portion 26A of the gimbal mechanism 26, respectively.

The first positioning device 28 is coupled to the first and second portions 26A, 26B of the gimbal mechanism 26. The first positioning device 28 includes a first motor 57, a first gear 58, a second gear 60, and a first shaft 62. The second gear 60 is coupled to the first portion 26A of the gimbal mechanism 26 using conventional fasteners (not shown) while the first shaft 62 is coupled to the second gear 60 and the second portion 26B through the first axis pivot 54. The first shaft 62 rotates within the first axis pivot 54 so that as the second gear 60 rotates, the first portion 26A of the gimbal mechanism 26 rotates with respect to the second portion 26B of the gimbal mechanism 26. The first gear 58 is coupled to a shaft 57A of the first motor 57. The teeth on the first gear 58 correspond to and engage the teeth on the second gear 60 such that as the first motor 57 rotates the first gear 58, the second gear 60 rotates which effectuates rotation of the first portion 26A of the gimbal mechanism 26, and hence the frame 24, with respect to the second portion 26B of the gimbal mechanism 26. Accordingly, the angle of the frame 24 and the laser beam 32 with respect to the X-axis is adjusted.

The second positioning device 30 is coupled to the first portion 26A of the gimbal mechanism 26 and the frame 24. The second positioning device 30 includes a second motor 64, a third gear 66, a fourth gear 68, and a second shaft 70. The fourth gear 68 is coupled to the frame 24 through conventional fasteners (not shown) while the second shaft 70 is coupled to the fourth gear 68 and the first portion 26A of the gimbal mechanism 26 through the second axis pivot 56. The second shaft 70 rotates within the second axis pivot 56 so that as the third gear 66 rotates, the frame 24 rotates with respect to the first portion 26A of the gimbal mechanism 26. The third gear 66 is coupled to a shaft 64A of the motor 64. The teeth on the third gear 66 correspond to and engage the teeth on the fourth gear 68 such that as the second motor 64 rotates the third gear 66, the fourth gear 68 rotates which effectuates rotation of the frame 24. Accordingly, the angle of the frame 24 and the laser beam 32 with respect to the Y-axis is adjusted.

It will be appreciated by those skilled in the art that other conventional gearing schemes may be used to effectuate a change in the angular orientation of the frame 24, and hence the laser beam 32 with respect to the X and Y axes. It will be further appreciated by those skilled in the art that belt drive systems or direct drive systems may be used to effectuate a change in the angular orientation of the frame 24, and hence the laser beam 32 with respect to the X and Y axes without departing from the scope of the present invention. It will be even further appreciated by those skilled in the art that other positioning devices may be used to effectuate a change in the angular orientation of the frame 24, and hence the laser beam 32 with respect to the X and Y axes without departing from the scope of the present invention.

The optical projecting device 22 also includes a rotary encoder 44. The rotary encoder 44 includes an encoder disc 46 and a read head 48. In the illustrated embodiment, the encoder disc 46 has a plurality of graduations 50 around the periphery of the disc 46 which are read by the read head 48. The read head 48 includes an optical source 48A and an optical detector 48B. The encoder disc 46 is positioned between the optical source 48A and the optical detector 48B so that as the encoder disc 46 rotates, the read head 48 generates a rotary signal representative of the position of the encoder disc 46, and hence the laser beam 32 as it emerges from the pentaprism 38. As is well known in the art, the encoder disc 46 may contain graduations which are spaced in a manner so that each position around the disc is uniquely referenced. Such an encoder is commonly known as an absolute encoder. Alternatively, in the illustrated embodiment, the encoder disc 46 contains an index mark graduation 52 and a number of equally spaced graduations 50 so that the position around the encoder disc 46 is referenced to the index mark graduation 52. The index mark graduation 52 and the read head 48 are aligned so that as the index mark 52 is detected by the read head, the projection direction 43 of the laser beam 32 is substantially parallel to and aligned with the X-axis or another reference position.

Figure 2:
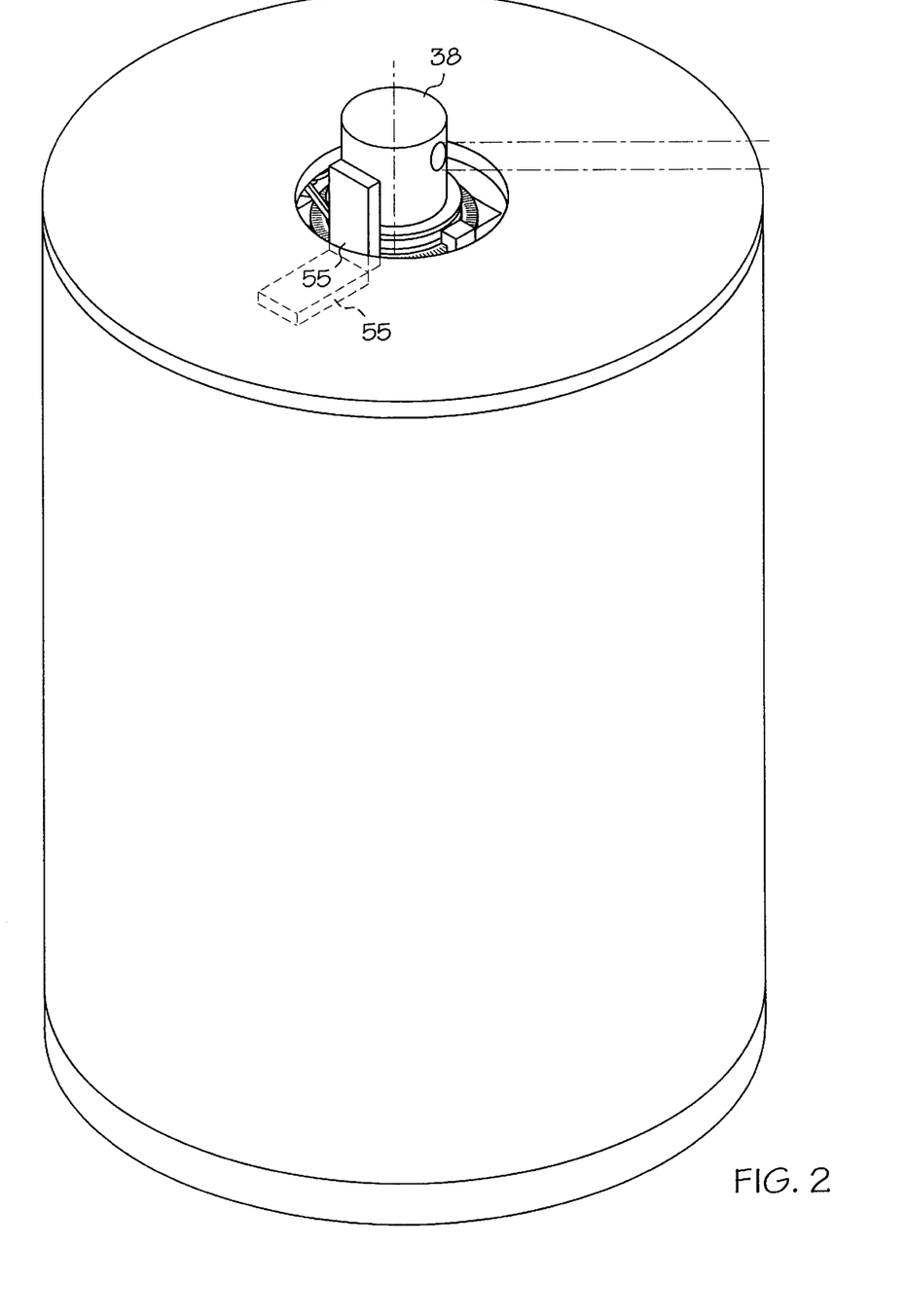
FIG. 2 is a perspective view of the laser transmitter of FIG. 1 illustrating a reference photodetector.

In yet another embodiment, the encoder disc 46 may comprise a plurality of equally spaced holes so that the position of the encoder disc 46 may be determined by counting the number of holes passing through the read head 48 with respect to some reference mark as the pentaprism 38 is rotated. In still yet another embodiment, the rotary encoder 44 may comprise a multi-position reference photodetector 55 as shown in FIG. 2. In a first position, the multi-position reference photodetector 55 is in the path of the laser beam 32 as it emerges from the pentaprism 38. The photodetector 55 is positioned so that the photodetector 55 provides an indication of the X-axis or another reference position when the laser beam 32 traverses and is detected by the reference photodetector 55. The photodetector 55 is placed in a second position (shown in phantom) out of the path of the laser beam 32 once the reference position is determined.

Figure 1:
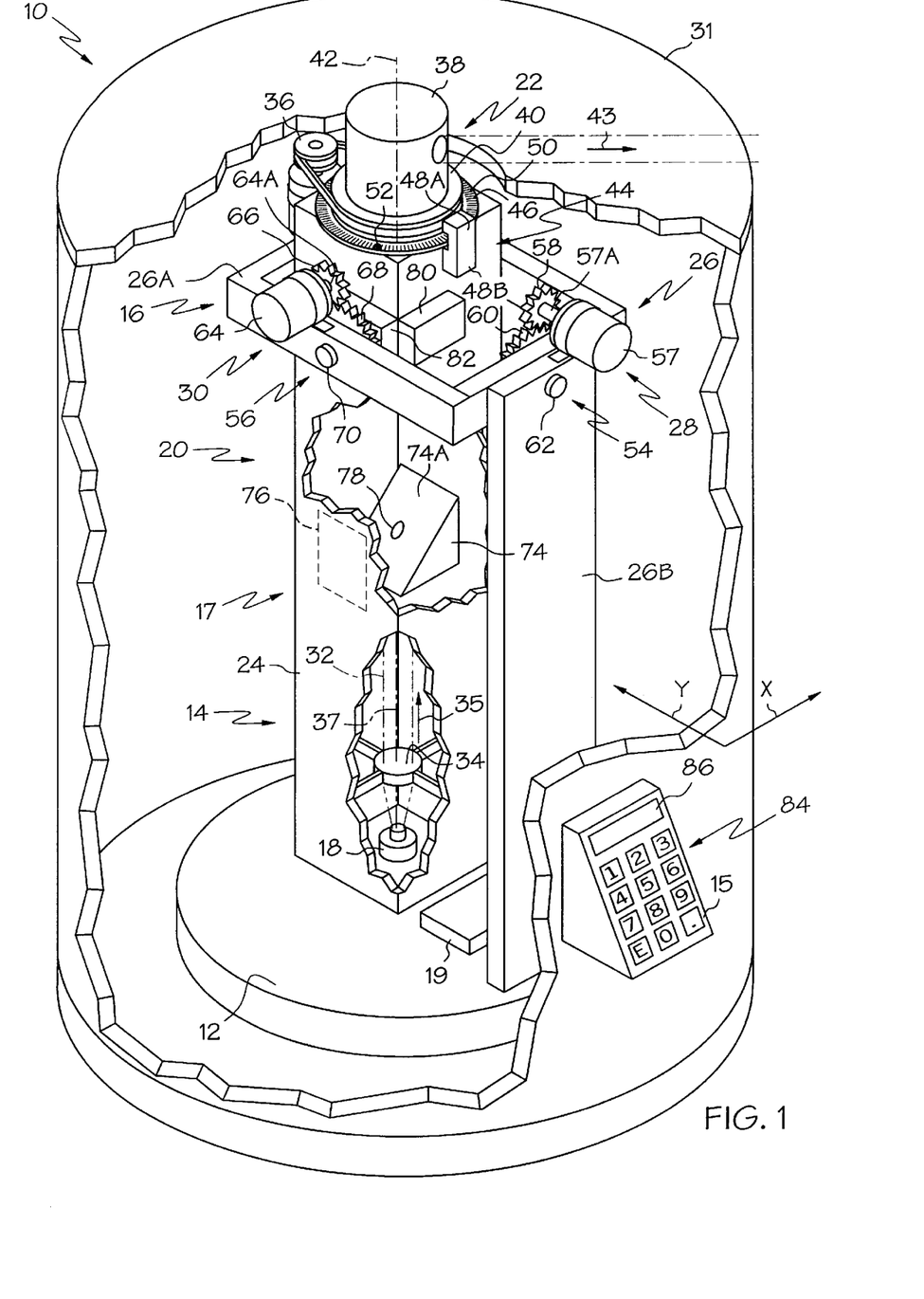
FIG. 1 is a perspective view of a laser transmitter according to the present invention.
Figures 3A, 3B:
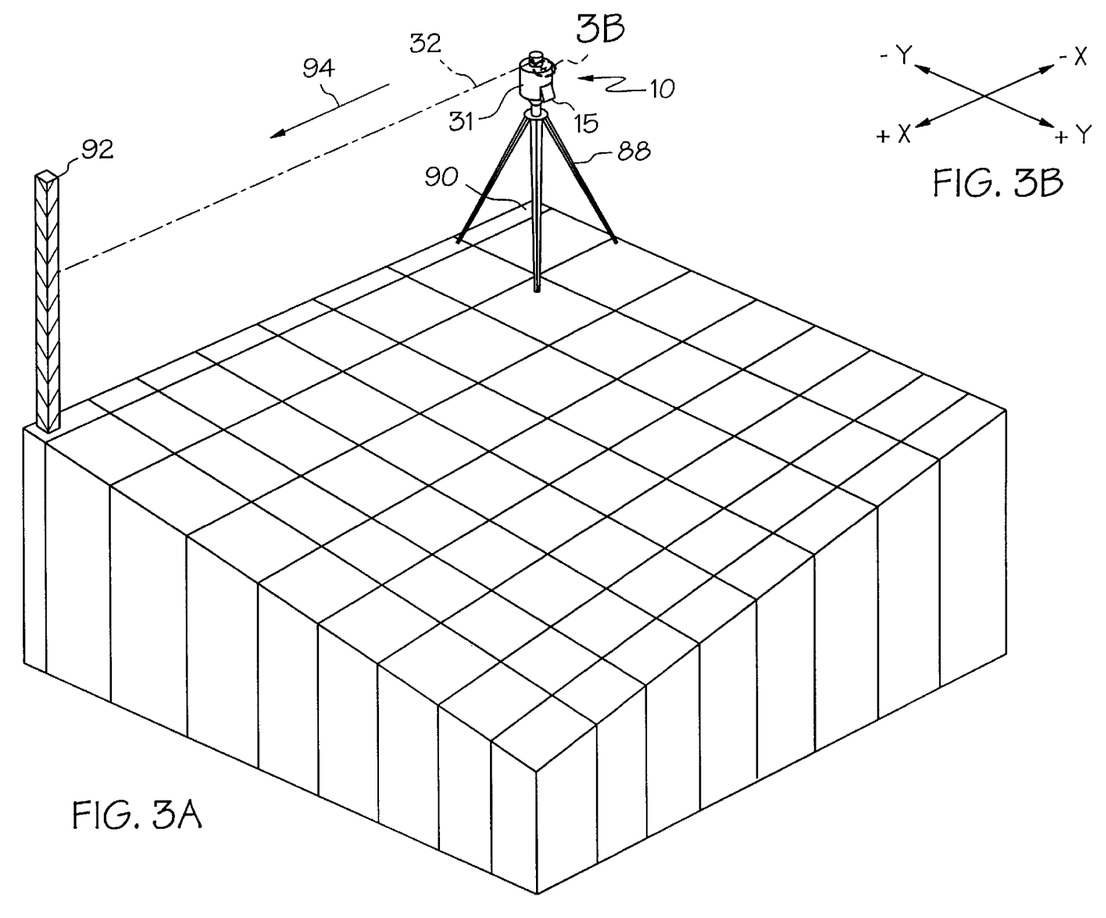
FIG. 3A is a schematic perspective view illustrating a field setup of the laser transmitter of FIG. 1 according to one embodiment of the present invention.
FIG. 3B illustrates the orientation of the X and Y axes imprinted on the laser transmitter of FIG. 3A.

In the illustrated embodiment of FIGS. 1 and 3A, the detector 17 (not shown in FIG. 3A) comprises a photodetecting system that is coupled to the frame 24. The photodetecting system includes a reflector 74, a photodetector 76 and a detector circuit (not shown). The reflector 74 includes an aperture 78 positioned along the projection axis 37. The aperture 78 is sized to pass the laser beam 32. The reflector 74 also includes a reflective surface 74A to reflect returned light to the photodetector 76. It will be appreciated by those skilled in the art that the photodetecting system may comprise additional optical components, such as a lens positioned between the reflector 74 and the photodetector 76 to focus the returned reflected light on the photodetector 76. The photodetector 76 in conjunction with the detector circuit generates a detector signal indicating reception of the laser beam 32. The angular position of the laser beam 32 in the projection direction 43 at the point of detection by the detector 17 is then determined using the rotary encoder 44.

Figures 4A, 4B:
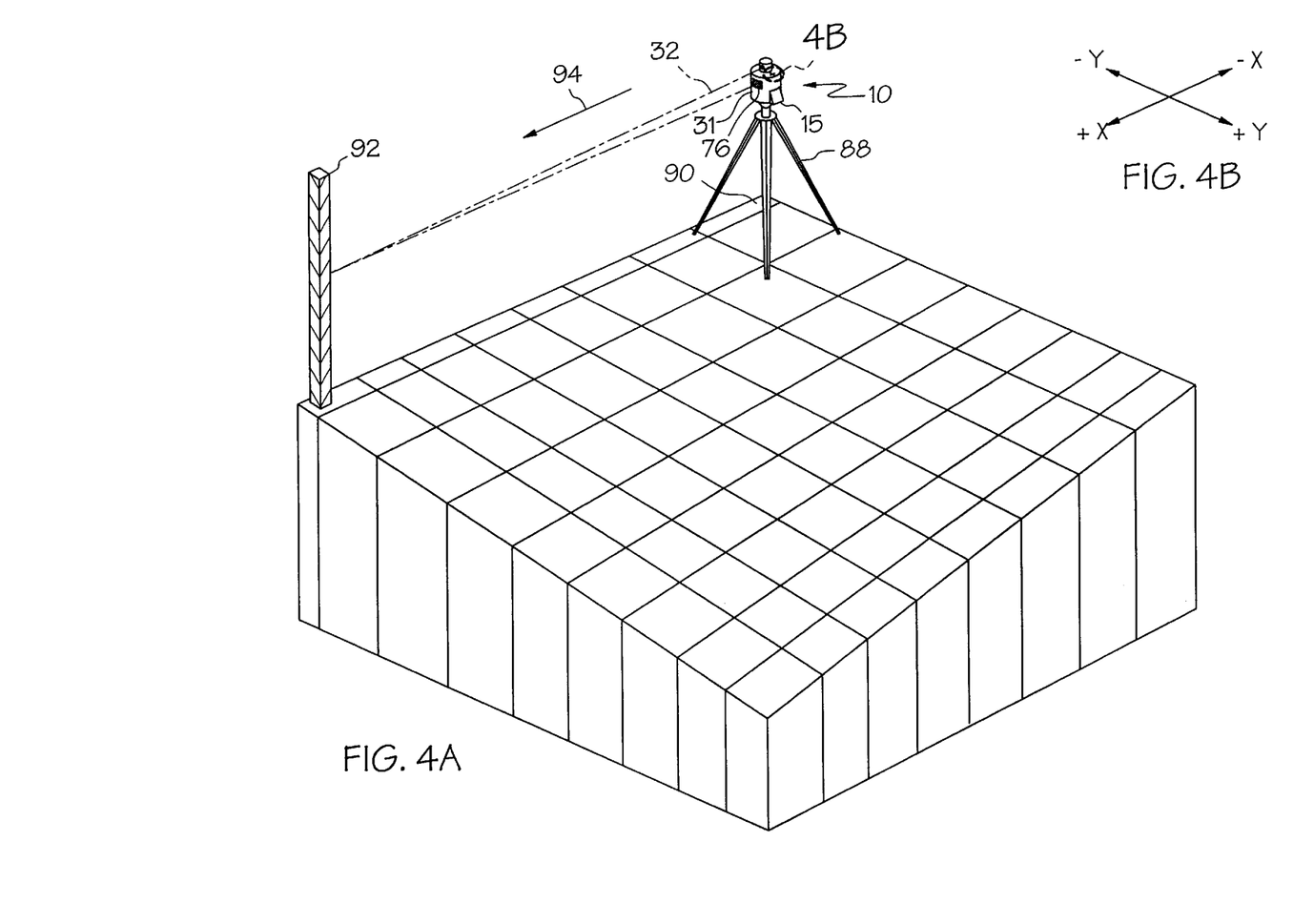
FIG. 4A is a schematic perspective view illustrating a field setup of the laser transmitter of FIG. 1 according to another embodiment of the present invention.
FIG. 4B illustrates the orientation of the X and Y axes imprinted on the laser transmitter of FIG. 4A.

In another embodiment of the present invention, the photodetector 76 may be coupled to an outer portion of the cover 31 as shown in FIG. 4A. The photodetector 76 is configured to receive the reflected laser beam 32 directly without the need for any intervening components. As with the embodiment illustrated in FIGS. 1 and 3A, the photodetector 76 in conjunction with the detector circuit generates the detector signal indicating reception of the laser beam 32.

Referring again to FIG. 1, the optical system 14 also includes a first level sensor 80 and a second level sensor 82. The first and second level sensors 80 and 82 are coupled to the frame 24. The first level sensor 80 is positioned so that it senses the angular orientation of the frame 24 relative to the X-axis while the second level sensor 82 is positioned so that it senses the angular orientation of the frame 24 relative to the Y-axis. The first and second level sensors 80 and 82 are preferably electrolytic leveling vials. An electrolytic vial oriented as shown in FIG. 1 provides an output representative of the angular orientation of the vial with respect to a substantially horizontal plane. The first and second level sensors 80, 82 therefore provide first and second level signals, respectively, representative of the angular orientation of the frame 24 with respect to the X and Y axes, respectively.

It should be appreciated by those skilled in the art that other configurations may be used to sense and position the frame 24 relative to the X and Y axes. For example, the first and second level sensors 80, 82 may be coupled to a separate mechanism (not shown) that is coupled to and pivots with respect to the frame 24. A grade mechanism (not shown) causes the separate mechanism to pivot so that it has a desired angular orientation with respect to the frame 24 and the X and Y axes. The positioning device 16 then adjusts the angular orientation of the frame 24 until the first and second level sensors 80, 82 are level again. The frame 24 therefore has the desired angular orientation with respect to the X and Y axes. Another example is set forth in U.S. Pat. No. 5,852,493, issued to Monnin on Dec. 22, 1998, herein incorporated by reference.

In the illustrated embodiment, the input device 15 comprises a keypad 84 and a display 86. The keypad 84 includes numeric keys for inputting a first slope for the rotating laser beam 32 along the X-axis and a second slope for the laser beam 32 along the Y-axis. The input device 15 generates an input signal representative of the first and second slopes. The display 86 provides a visual indication of the inputted slope along the X and Y axes. It will be appreciated by those skilled in the art that the display 86 may be configured to display additional information as desired. It will be further appreciated by those skilled in the art that other input devices may be used to input the first and second slopes. For example, a pair of mechanical dials may be used to input the first and second slopes with the dials providing the visual indication of the inputted slopes directly. The input device 15 may be removably coupled to the laser transmitter 10 or fixed in position as desired.

The input signal from the input device 15, the rotary signal from the rotary encoder 44, the detector signal from the detector 17 and the first and second level signals from the first and second level sensors 80, 82, respectively are transmitted to the processor 19. The processor 19 is programmed to control the positioning device 16 so that the laser beam 32 forms a plane with the first slope and the second slope in a desired direction in response to the above signals.

As shown in FIGS. 3A and 4A, the laser transmitter 10 is positioned on top of a tripod 88 and leveled using techniques well known in the art. Typically, the laser transmitter 10 will be positioned at one corner of a jobsite, e.g. 90, which is the intersection of the desired slopes with respect to the X-axis and with respect to the Y-axis. A target 92 is positioned in an alignment direction 94 corresponding to the desired direction for one of the slopes on the jobsite when two independent slopes are used or in the direction of the compound slope on the jobsite when a compound slope is used. The laser transmitter 10 is also configured so that the alignment direction 94 generally points in either the X-axis or the Y-axis. The X and Y axes are imprinted on top of the cover 31 as shown in FIGS. 3B and 3B to provide the user with a general indication as to the position of the axes.

Figure 5:
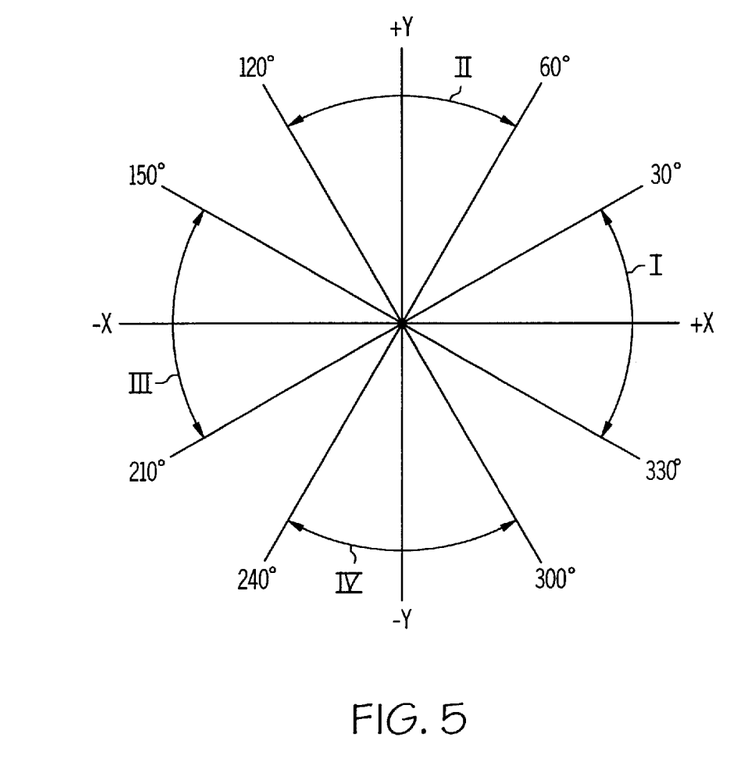
FIG. 5 illustrates detection zones for the laser transmitter of FIG. 1.
Figure 6:
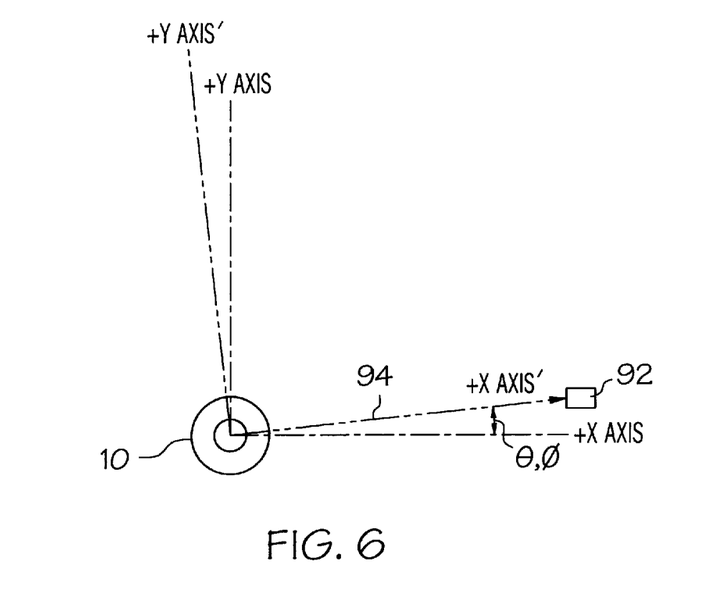
FIGS. 6–9 illustrate the relationship between an alignment direction, an X-axis, a Y-axis, an equivalent X-axis and an equivalent Y-axis in each of the detection zones.

Referring now to FIG. 5, the alignment direction 94 is aligned with respect to the positive X-axis, the positive Y-axis, the negative X-axis or the negative Y-axis depending on the angular orientation of the positive X-axis with respect to the alignment direction 94. In the illustrated embodiment, the alignment direction 94 is measured with respect to the positive X-axis. The processor 19 is programmed to determine an angle θ between the positive X-axis and the alignment direction 94 as shown in FIG. 6. In the illustrated embodiment, the processor 19 is further programmed so that there is a detection zone of plus or minus 30° about each axis as shown in FIG. 5. However, it will be appreciated by those skilled in the art that the detection zones may be any reasonable and appropriate angular value. Detection zone I corresponds to an angle θ between 330° and 30°, detection zone II corresponds to an angle θ between 60° and 120°, detection zone III corresponds to an angle θ between 150° and 210°, and detection zone IV corresponds to an angle θ between 240° and 300°.

Accordingly, in detection zone I, the alignment direction 94 corresponds to the desired direction of the first slope and an equivalent positive X-axis. In detection zone II, the alignment direction 94 corresponds to the desired direction of the second slope and an equivalent positive Y-axis. In detection zone III, the alignment direction 94 corresponds to the desired direction of the negative of the first slope and an equivalent negative X-axis. In detection zone IV, the alignment direction 94 corresponds to the desired direction of the negative of the second slope and an equivalent negative Y-axis. As described below, the angle used for determining how to adjust the laser transmitter 10 so that the laser beam 32 defines the desired plane varies depending on the detection zone. The actual measured angle θ is used when the target 92 is positioned in detection zone I. The measured angle θ minus 90° is used when the target 92 is positioned in detection zone II. The measured angle θ minus 180° is used when the target 92 is positioned in detection zone III. The measured angle θ minus 270° is used when the target 92 is positioned in detection zone IV. It should thus be apparent that the calculations for adjusting the laser transmitter 10 are referenced about the positive X-axis. However, it will be appreciated by those skilled in the art that the calculations may be referenced with respect to any reasonable axis.

Figures 10A, 10B:
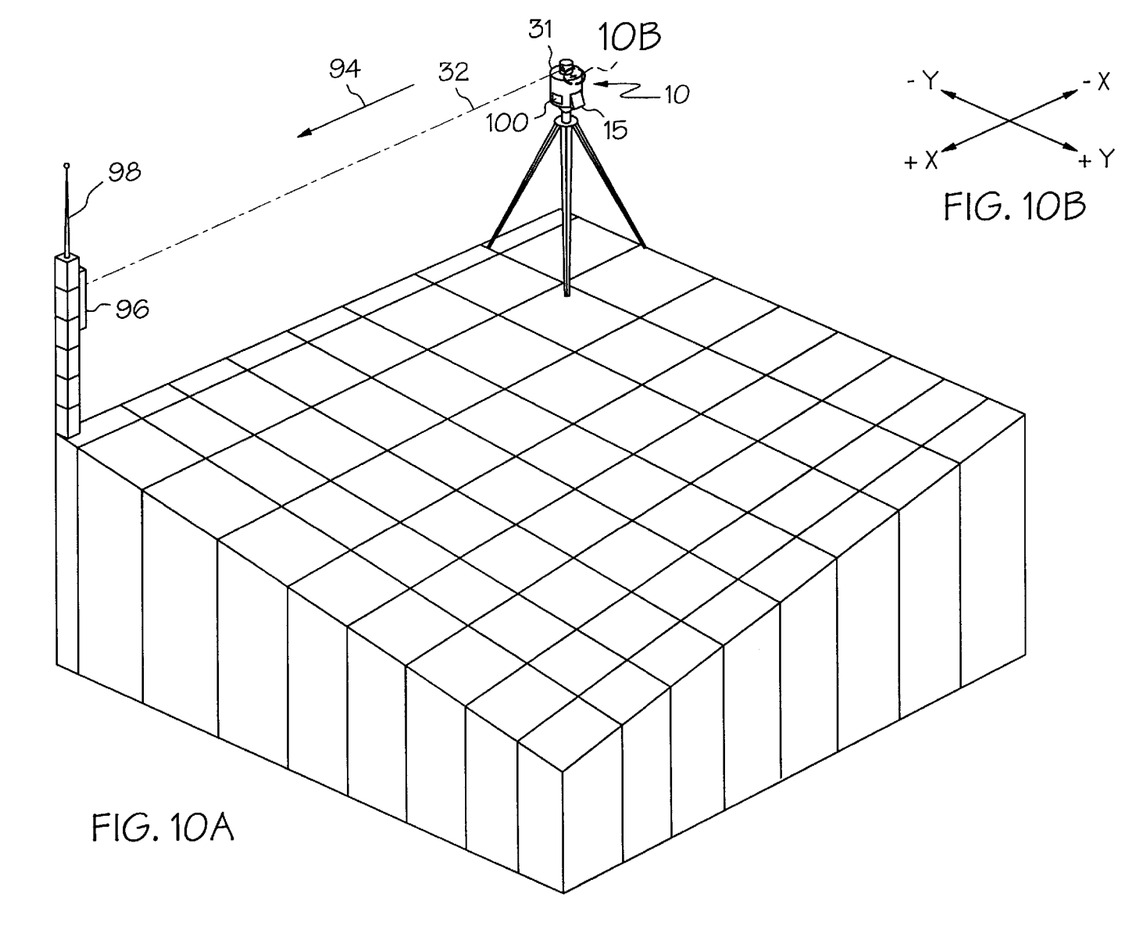
FIG. 10A is a schematic perspective view illustrating a field setup of the laser transmitter of FIG. 1 according to yet another embodiment of the present invention.
FIG. 10B illustrates the orientation of the X and Y axes imprinted on the laser transmitter of FIG. 10A.

The laser transmitter 10 includes a representation of the X and Y axes to aid in the set-up of the laser transmitter 10 as shown in FIGS. 3B, 4B and 10B. The angular position of the laser transmitter 10 is adjusted so that the desired axis generally points in the alignment direction 94. In most situations, the laser transmitter 10 will be positioned so that the alignment direction 94 is within ±5 degrees of the desired axis. A margin of ±30 degrees about each axis therefore provides sufficient tolerance for proper alignment. If the target 92 is not positioned within one of the detection zones, e.g., 45 degrees from the positive X axis, the laser transmitter 10 will have to be rotated appropriately to bring the target 92 into one of the detection zones. The operator enters the first slope and the second slope into the laser transmitter 10 via the input device 15. It should be apparent in those applications where a compound slope is used that the operator will use the compound slope as the first slope and a slope of zero as the second slope with the target 92 being positioned in the direction of the compound slope.

The laser beam 32 is activated so that the alignment direction 94 may be determined. The laser beam 32 is typically not modulated for this application as the pulse generated as the beam sweeps across the photocell is a narrow pulse which differentiates it from "DC" ambient light. However, it will be appreciated by those skilled in art that the laser beam 32 may be modulated to distinguish the laser beam 32 from other light sources, such as any of the numerous other ambient light sources. It will be appreciated by those skilled in the art that the laser beam 32 may be modulated to any reasonable frequency appropriate for the particular application.

In the illustrated embodiment of FIGS. 1, 3A and 4A, the target 92 comprises a laser reflector, such as a corner cube, retroreflective tape or the like. The laser beam 32 is reflected from the target 92 back to the laser transmitter 10 where it is detected directly by the photodetector 76 as shown in FIG. 4 or reflected by the pentaprism 38 and the reflector 74 where it is detected by the photodetector 76 as shown in FIGS. 1 and 3. The detector 17 generates the detector signal that is transmitted to the processor 19 indicating reception of the reflected laser beam. The processor 19 determines the angular position of the pentaprism 38, and hence the laser beam 32, with respect to the X-axis at the point of reception based on the position of the rotary disk 46 as indicated by the rotary signal. The processor 19 is configured to average a number of measurements for increased accuracy. The laser beam 34 is turned off momentarily for a couple of seconds or longer as desired providing the operator an indication that the alignment direction 94 has been determined and the target 92 may be removed. It will be appreciated by those skilled in the art that other visual or audio signals may be used to indicate that the alignment direction 94 has been determined. The processor 19 determines an angle θ between the alignment direction 94 and the X-axis. The processor 19 then calculates a first calculated slope and a second calculated slope based on the angle θ, the first slope and the second slope.

The processor 19 controls the positioning device 16 so that the laser beam 32 defines a plane with the first slope and the second slope aligned with respect to the alignment direction 94. The first positioning device 28 is adjusted until the angular orientation of the frame 24, and hence the laser beam 32, with respect to the X-axis corresponds to the first calculated slope. Similarly, the second positioning device 30 is adjusted until the angular orientation of the frame 24, and hence the laser beam 32, with respect to the Y-axis corresponds to the second calculated slope. The first and second leveling sensors 80, 82 provide feedback to the processor 19 indicating the angular orientation of the frame 24 with respect to the X and Y axes.

Representative examples of the present invention in each detection zone is illustrated in FIGS. 6–9. Referring now to FIG. 6, the laser transmitter 10 is shown with the target 92 positioned in detection zone I such that the alignment direction 94 corresponds to the desired direction of the first slope and the equivalent positive X-axis'. The desired first and second slopes with respect to the X and Y axes are inputted into the laser transmitter 10 with the desired direction of the first slope corresponding to the alignment direction 94. An angle φ is then calculated which corresponds to the angle θ as the target 92 is positioned in detection zone I. The equivalent positive X-axis' therefore corresponds to an axis φ degrees from the positive X-axis.

Figure 7:
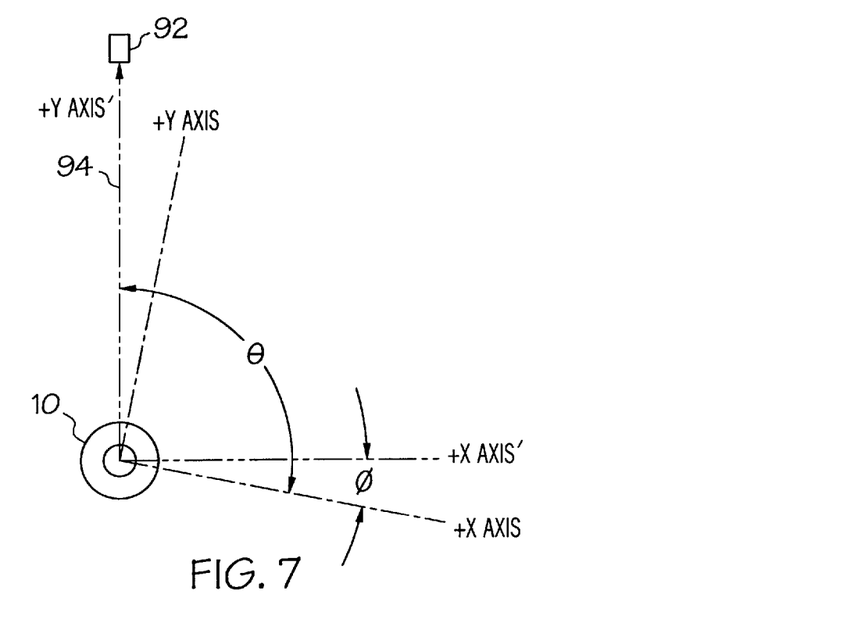

Referring now to FIG. 7, the laser transmitter 10 is shown with the target 92 positioned in detection zone II such that the alignment direction 94 corresponds to the desired direction of the second slope and the equivalent positive Y-axis'. The desired first and second slopes with respect to the X and Y axes are inputted into the laser transmitter 10 with the desired direction of the second slope corresponding to the alignment direction 94. An angle φ is then calculated which corresponds to the angle θ minus 90° as the target 92 is positioned in detection zone II. The equivalent positive X-axis' is therefore determined and corresponds to an axis φ degrees from the positive X-axis. Assuming that the first and second slopes are the same in both cases, it should thus be apparent that in the case where φ equals the same angle with the target 92 in either detection zone I or detection zone II that the laser beam 32 will define the same plane whether the alignment direction 94 corresponds to the desired direction of the first slope or the second slope.

Figure 8:
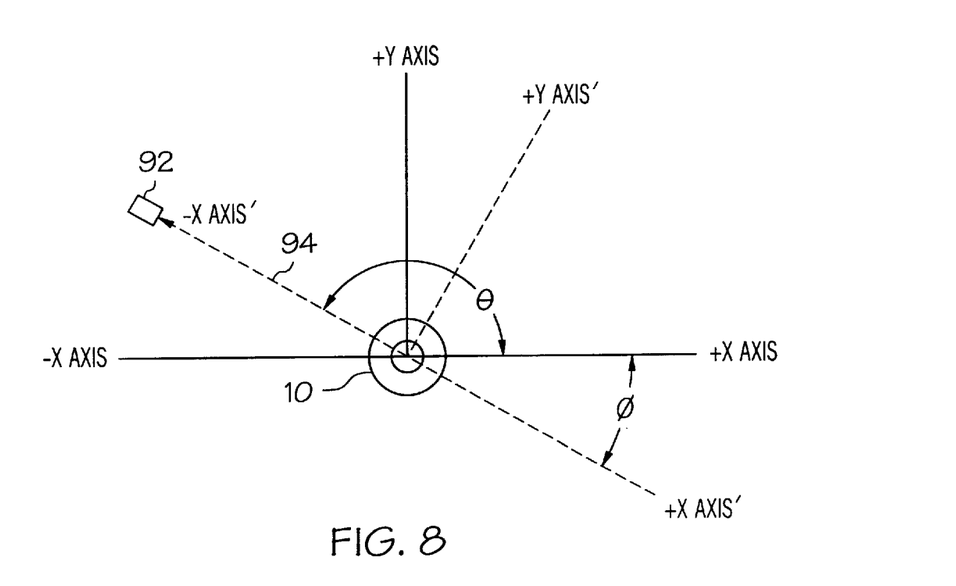

Referring now to FIG. 8, the laser transmitter 10 is shown with the target 92 positioned in detection zone III such that the alignment direction 94 corresponds to the desired direction of the negative of the first slope and the equivalent negative X-axis'. It is well known that a +1% slope with respect to the +X-axis corresponds to a −1% slope in the −X-axis. In the illustrated example, the first slope inputted in the laser transmitter 10 will actually correspond to the negative of the actual slope desired in the alignment direction 94 and the second slope inputted in the laser transmitter 10 will correspond to the actual slope desired. An angle φ is then calculated which corresponds to the angle θ minus 180° as the target 92 is positioned in detection zone III. The equivalent positive X-axis' is therefore determined and corresponds to an axis φ degrees from the positive X-axis. Any calculations made with respect to the equivalent positive X-axis' will have the opposite affect with respect to the equivalent negative X-axis' as intended.

Figure 9:
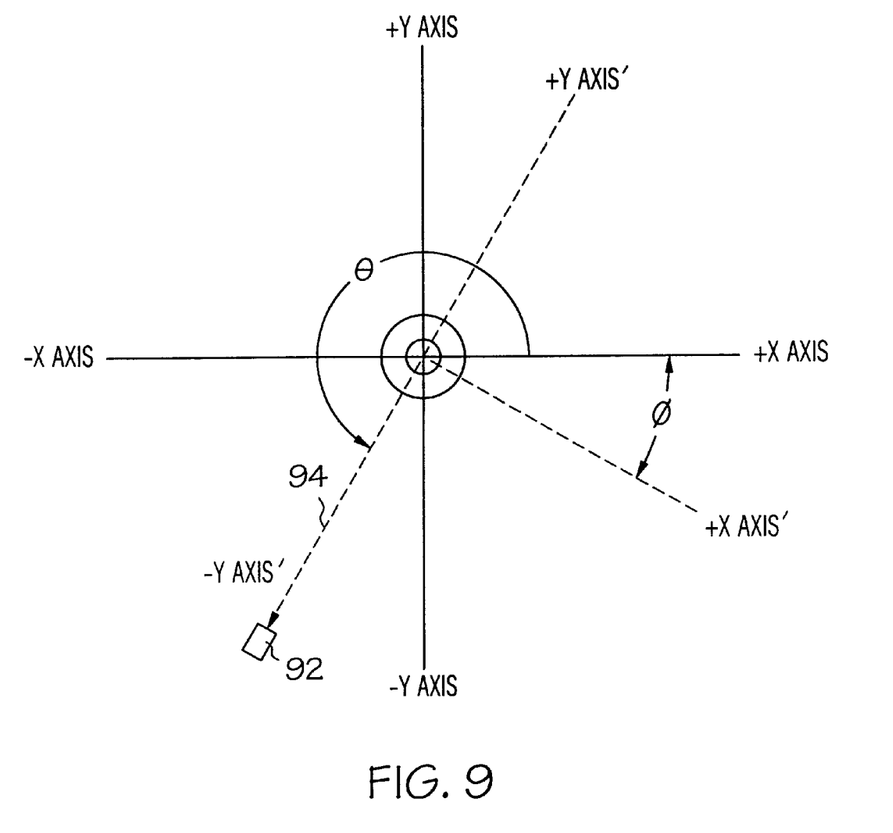

Referring now to FIG. 9, the laser transmitter 10 is shown with the target 92 positioned in detection zone IV such that the alignment direction 94 corresponds to the desired direction of the second slope and the equivalent negative Y-axis'. In the illustrated example, the second slope inputted in the laser transmitter 10 will actually correspond to the negative of the actual slope desired in the alignment direction 94 and the first slope inputted in the laser transmitter 10 will correspond to the negative of the actual slope desired. An angle φ is then calculated which corresponds to the angle θ minus 270° as the target 92 is positioned in detection zone IV. The equivalent positive X-axis' is therefore determined and corresponds to an axis φ degrees from the positive X-axis. Any calculations made with respect to the equivalent positive X-axis' will have the opposite affect with respect to the equivalent negative X-axis' as intended.

Equations (A) and (B) will now to be developed for calculating the first calculated slope and the second calculated slope. As stated above the angle φ is calculated based on the angle θ and the position of the target 92 as follows:

$$\phi = \theta \quad \text{if } 330° \leq \theta \leq 30°;$$
$$\phi = \theta - 90° \quad \text{if } 60° \leq \theta \leq 120°;$$
$$\phi = \theta - 180° \quad \text{if } 150° \leq \theta \leq 210°; \text{ and}$$
$$\phi = \theta - 270° \quad \text{if } 240° \leq \theta \leq 330°.$$

The equation for the plane z with a first slope m with respect to the X-axis and a second slope n with respect to the Y-axis is:

$$z = mx + ny. \tag{1}$$

Similarly, the equation for a plane z in the X' and Y' axes having a first slope m' with respect to the X'-axis and a second slope n' with respect to the Y'-axis is:

$$z = m'x' + n'y'. \tag{2}$$

Referring now to FIGS. 6–9, the equations of rotation for the X and Y axes is:

$$x = x' \cos(\phi) - y' \sin(\phi); \tag{3}$$

and $$y = x' \sin(\phi) + y' \cos(\phi). \tag{4}$$

Substituting equations (3) and (4) into equation (1) and solving yields:

$$z = (m \cos(\phi) + n \sin(\phi)) x' + (n \cos(\phi) - m \sin(\phi)) y'. \tag{5}$$

The plane specified in equation (5) corresponds to the plane specified in equation (1) except equation (5) is defined with respect to the X' and Y' axes. Equations (1) and (5) therefore define the same plane.

Reverse substitution of equation (5) into equation (2) yields:

$$m' = m \cos(\phi) + n \sin(\phi); \quad (6)$$

and $$n' = n \cos(\phi) - m \sin(\phi). \quad (7)$$

Solving for n in equation (7) yields:

$$n = (n' + m \sin(\phi))/\cos(\phi). \quad (8)$$

Substituting equation (8) into equation (6) and solving for m which corresponds to the first calculated slope yields:

$$m' = m \cos(\phi) + \sin(\phi)((n' + m \sin(\phi))/\cos(\phi); \quad (9)$$

$$m' \cos(\phi) = m \cos^2(\phi) + n' \sin(\phi) + m \sin^2(\phi); \quad (10)$$

$$m(\cos^2(\phi) + \sin^2(\phi)) = m' \cos(\phi) - n' \sin(\phi); \quad (11)$$

$$m = m' \cos(\phi) - n' \sin(\phi). \quad (A)$$

Substituting equation (A) into equation (7) and solving for n which corresponds to the second calculated slope yields:

$$n' = n \cos(\phi) - \sin(\phi)(m' \cos(\phi) - n' \sin(\phi)); \quad (12)$$

$$n \cos(\phi) = n' + m' \cos(\phi) \sin(\phi) - n' \sin^2(\phi); \quad (13)$$

$$n = n'(1 - \sin^2(\phi))/\cos(\phi) + (m' \cos(\phi) \sin(\phi))/\cos(\phi); \quad (14)$$

$$n = n' \cos(\phi) + m' \sin(\phi). \quad (B)$$

The first and second slopes m' and n' in equations (A) and (B) are actually the first and second slopes inputted by the operator into the laser transmitter 10 so as to define the desired plane with respect to the desired X' and Y' axes. The first and second calculated slopes m and n correspond to the slopes required to define the desired plane with respect to the X and Y axes. It will be appreciated by those skilled in the art that other equations may be developed in those cases where the X-axis is not substantially orthogonal to the Y-axis.

In another embodiment of the present invention, the target 92 comprises a photodetector 96 and an electromagnetic transmitter 98 as shown in FIG. 10A. The target 92 is powered by an independent power supply (not shown). The detector 17 comprises an electromagnetic receiver 100 coupled to the cover 31. When the laser beam 32 is detected by the photodetector 96, an electromagnetic wave is transmitted by the transmitter 98 to the receiver 100 indicating reception of the laser beam 32. The detector 17 generates the detector signal that is transmitted to the processor 19 indicating reception of the laser beam 32. The processor 19 determines the angular position of the pentaprism 38, and hence the laser beam 32, at the point of reception based on the position of the rotary disk 46 as indicated by the rotary signal. The laser beam 34 is turned off providing the operator an indication that the alignment direction 94 has been determined and the target 92 may be removed.

Having described the invention in detail and by reference to preferred embodiments thereof, it will be apparent that modifications and variations are possible without departing from the scope of the invention defined in the appended claims.

What is claimed is:

1. A laser transmitter comprising:
   an optical system arranged to generate a laser beam, said optical system projecting said laser beam radially along a rotational arc defined about a central rotational axis thereby defining a plane through which said laser beam is projected;
   a positioning device coupled to said optical system for adjusting an angular orientation of said optical system with respect to a first axis and with respect to a second axis;
   an input device generating an input signal representative of a first slope of said laser beam with respect to said first axis and a second slope of said laser beam with respect to said second axis;
   a rotary encoder arranged to produce a rotary signal indicative of a rotary position of said laser beam relative to said rotational arc;
   a detector arranged to generate a detector signal indicative of reception of said laser beam; and
   a processor adapted to receive said input signal, said rotary signal and said detector signal and programmed to:
      determine an alignment direction with respect to one of said first axis and said second axis about which said first slope and said second slope are to be aligned in response to said detector signal and said rotary signal;
      calculate a first calculated slope and a second calculated slope based on said alignment direction, said first slope and said second slope so that said plane through which said laser beam is projected corresponds to said first slope and said second slope in said alignment direction; and
      control said positioning device in response to said first calculated slope and said second calculated slope so that said plane through said laser beam is projected corresponds to said first slope and said second slope in said alignment direction.

2. The laser transmitter of claim 1, wherein said detector comprises a photodetecting system receiving a reflected laser beam based on said laser beam projected in said alignment direction.

3. The laser transmitter of claim 2, wherein said photodetecting system comprises a photodetector positioned within said optical system.

4. The laser transmitter of claim 2, wherein said photodetecting system comprises a photodetector coupled to an outer portion of said laser transmitter.

5. The laser transmitter of claim 1, wherein said detector comprises an electromagnetic receiver receiving an electromagnetic wave indicating reception of said laser beam projected in said alignment direction.

6. The laser transmitter of claim 1, wherein said rotary encoder comprises a read head and a rotary disk having an index mark and a plurality of reference marks, said index mark and said read head being aligned so that as said index mark is detected by said read head, said laser beam is projected in a projection direction substantially parallel to and aligned with said first axis.

7. The laser transmitter of claim 1, wherein said rotary encoder comprises an absolute rotary encoder.

8. The laser transmitter of claim 1, wherein said rotary encoder comprising a read head, a rotary disk having a plurality of reference marks and a reference photocell, said reference photocell being aligned with said first axis thereby providing an indication of said first axis when said laser beam traverses said reference photocell.

9. The laser transmitter of claim 8, wherein said reference photocell includes a first position in a path of said laser beam and a second position out of said path of said laser beam.

10. The laser transmitter of claim 1, wherein said rotary encoder comprises a read head and a rotary disk having a plurality of holes.

11. The laser transmitter of claim 1, wherein said processor is further programmed to determine an angle θ between said first axis and said alignment direction in response to said rotary signal and said detector signal.

12. The laser transmitter of claim 11, wherein said processor is further programmed to determine an angle φ between said first axis and an equivalent first axis based on said alignment direction as follows:

$$\phi = \theta \quad \text{if } 330° \leq \theta \leq 30°;$$
$$\phi = \theta - 90° \quad \text{if } 60° \leq \theta \leq 120°;$$
$$\phi = \theta - 180° \quad \text{if } 150° \leq \theta \leq 210°; \text{ and}$$
$$\phi = \theta - 270° \quad \text{if } 240° \leq \theta \leq 330°.$$

13. The laser transmitter of claim 12, wherein said processor is further programmed to calculate said first calculated slope and said second calculated slope using the following equations:

$$m = m' \cos(\phi) - n' \sin(\phi);$$

and $$n = n' \cos(\phi) + m' \sin(\phi)$$

where:
m is the first calculated slope;
n is the second calculated slope;
m' is the first slope;
n' is the second slope; and
φ is the angle between said first axis and said equivalent first axis.

14. The laser transmitter of claim 11, wherein said processor is further programmed to calculate said first calculated slope and said second calculated slope using the following equations:

$$m = m' \cos(\phi) - n' \sin(\phi);$$

and $$n = n' \cos(\phi) + m' \sin(\phi)$$

where:
m is the first calculated slope;
n is the second calculated slope;
m' is the first slope;
n' is the second slope; and
φ is an angle between said first axis and an equivalent first axis based on said angle θ.

15. The laser transmitter of claim 1, wherein said first slope is a compound slope and wherein said alignment direction is a direction of said compound slope.

16. The laser transmitter of claim 1, wherein said positioning device comprises a first positioning system for adjusting said angular orientation of said optical system with respect to said first axis and a second positioning system for adjusting said angular orientation of said optical system with respect to said second axis.

17. The laser transmitter of claim 1, wherein said processor is further programmed to provide an indication that said alignment direction has been determined.

18. The laser transmitter of claim 17, wherein said processor turns said laser beam off to provide said indication.

19. The laser transmitter of claim 18, wherein said processor turns said laser beam off momentarily to provide said indication.

20. The laser transmitter of claim 1, wherein said first axis comprises a positive first axis and a negative first axis, and wherein said second axis comprises a positive second axis and a negative second axis.

21. The laser transmitter of claim 1, wherein said first axis is substantially orthogonal to said second axis.

22. The laser transmitter of claim 1, wherein said processor is programmed to determine said alignment direction based on an average of readings of said rotary signal from said rotary encoder.

23. A laser transmitting system comprising:
an optical system arranged to generate a laser beam, said optical system projecting said laser beam radially along a rotational arc defined about a central rotational axis thereby defining a plane through which said laser beam is projected;
a positioning device coupled to said optical system for adjusting an angular orientation of said optical system with respect to a first axis and with respect to a second axis;
an input device generating an input signal representative of a first slope of said laser beam with respect to said first axis and a second slope of said laser beam with respect to said second axis;
a rotary encoder arranged to produce a rotary signal indicative of a rotary position of said laser beam relative to said rotational arc;
a target positioned in an alignment direction;
a detector arranged to generate a detector signal indicative of reception of said laser beam by said target; and
a processor adapted to receive said input signal, said rotary signal and said detector signal and programmed to:
determine said alignment direction with respect to one of said first axis and said second axis about which said first slope and said second slope are to be aligned in response to said detector signal and said rotary signal;
calculate a first calculated slope and a second calculated slope based on said alignment direction, said first slope and said second slope so that said plane through which said laser beam is projected corresponds to said first slope and said second slope in said alignment direction; and
control said positioning device in response to said first calculated slope and said second calculated slope so that said plane through said laser beam is projected corresponds to said first slope and said second slope in said alignment direction.

24. The laser transmitting system of claim 23, wherein said detector comprises a photodetecting system and said target comprises a retroreflector, said photodetecting system receiving a reflected laser beam from said target.

25. The laser transmitting system of claim 24, wherein said photodetecting system comprises a photodetector positioned within said optical system.

26. The laser transmitting system of claim 24, wherein said photodetecting system comprises a photodetector coupled to an outer portion of said laser transmitter.

27. The laser transmitting system of claim 23, wherein said detector comprises an electromagnetic receiver and said target comprises a photocell and an electromagnetic transmitter, said electromagnetic transmitter transmitting an electromagnetic wave to said electromagnetic receiver upon detection of said laser beam by said photocell indicating reception of said laser beam projected in said alignment direction.

28. The laser transmitting system of claim 23, wherein said rotary encoder comprises a read head and a rotary disk having an index mark and a plurality of reference marks, said index mark and said read head being aligned so that as said index mark is detected by said read head, said laser beam is projected in a projection direction substantially parallel to and aligned with said first axis.

29. The laser transmitting system of claim 23, wherein said rotary encoder comprises an absolute rotary encoder.

30. The laser transmitting system of claim 23, wherein said rotary encoder comprising a read head, a rotary disk having a plurality of reference marks and a reference photocell, said reference photocell being aligned with said first axis thereby providing an indication of said first axis when said laser beam traverses said reference photocell.

31. The laser transmitting system of claim 23, wherein said reference photocell includes a first position in a path of said laser beam and a second position out of said path of said laser beam.

32. The laser transmitting system of claim 23, wherein said rotary encoder comprises a read head and a rotary disk having a plurality of holes.

33. The laser transmitting system of claim 23, wherein said processor is further programmed to determine an angle $\theta$ between said first axis and said alignment direction in response to said rotary signal and said detector signal.

34. The laser transmitting system of claim 33, wherein said processor is further programmed to determine an angle $\phi$ between said first axis and an equivalent first axis based on said alignment direction as follows:

$$\phi = \theta \quad \text{if } 330° \le \theta \le 30°;$$
$$\phi = \theta - 90° \quad \text{if } 60° \le \theta \le 120°;$$
$$\phi = \theta - 180° \quad \text{if } 150° \le \theta \le 210°; \text{ and}$$
$$\phi = \theta - 270° \quad \text{if } 240° \le \theta \le 330°.$$

35. The laser transmitting system of claim 34, wherein said processor is further programmed to calculate said first calculated slope and said second calculated slope using the following equations:

$$m = m' \cos(\phi) - n' \sin(\phi);$$

and $$n = n' \cos(\phi) + m' \sin(\phi)$$

where:
m is the first calculated slope;
n is the second calculated slope;
m' is the first slope;
n' is the second slope; and
$\phi$ is the angle between said first axis and said equivalent first axis.

36. The laser transmitting system of claim 33, wherein said processor is further programmed to calculate said first calculated slope and said second calculated slope using the following equations:

$$m = m' \cos(\phi) - n' \sin(\phi);$$

and $$n = n' \cos(\phi) + m' \sin(\phi)$$

where:
m is the first calculated slope;
n is the second calculated slope;
m' is the first slope;
n' is the second slope; and
$\phi$ is an angle between said first axis and an said equivalent first axis based on said angle $\theta$.

37. The laser transmitting system of claim 23, wherein said first slope is a compound slope and wherein said alignment direction is a direction of said compound slope.

38. The laser transmitting system of claim 23, wherein said positioning device comprises a first positioning system for adjusting said angular orientation of said optical system with respect to said first axis and a second positioning system for adjusting said angular orientation of said optical system with respect to said second axis.

39. The laser transmitting system of claim 23, wherein said processor is further programmed to provide an indication that said alignment direction has been determined.

40. The laser transmitting system of claim 39, wherein said processor turns said laser beam off to provide said indication.

41. The laser transmitting system of claim 40, wherein said processor turns said laser beam off momentarily to provide said indication.

42. The laser transmitting system of claim 23, wherein said first axis comprises a positive first axis and a negative first axis, and wherein said second axis comprises a positive second axis and a negative second axis.

43. The laser transmitting system of claim 23, wherein said first axis is substantially orthogonal to said second axis.

44. The laser transmitting system of claim 23, wherein said processor is programmed to determine said alignment direction based on an average of readings of said rotary signal from said rotary encoder.

45. A method of projecting a laser beam in a plane having a first slope with respect to a first axis and a second slope with respect to a second axis, said method comprising the steps of:

projecting said laser beam from a laser source such that it rotates along a rotational arc defined about a central rotational axis and sweeps across a target, said target being position in an alignment direction;

determining said alignment direction with respect to one of said first axis and said second axis;

calculating a first calculated slope and a second calculated slope based on said alignment direction, said first slope and said second slope, said first calculated slope corresponding to said first slope in said alignment direction and said second calculated slope corresponding to said second slope in said alignment direction; and positioning said laser source at said first calculated slope with respect to said first axis and said second calculated slope with respect to said second axis so that said rotating laser beam defines said plane corresponding to said first slope and said second slope in said alignment direction.

46. The method of claim 45, wherein said step of determining said alignment direction with respect to one of said first axis and said second axis comprises the step of detecting a reflected laser beam from said target.

47. The method of claim 46, wherein said step of determining said alignment direction with respect to one of said first axis and said second axis comprises the step of using a rotary encoder to determine said alignment direction in response to said reflected laser beam.

48. The method of claim 47, wherein said rotary encoder comprises an absolute rotary encoder.

49. The method of claim 46, wherein said rotary encoder comprises a read head and a rotary disk having an index mark and a plurality of reference marks, said index mark and said read head being aligned so that as said index mark is detected by said read head, said laser beam is projected in a projection direction substantially parallel to said first axis.

50. The method of claim 47, wherein said rotary encoder comprises a read head, a rotary disk having a plurality of reference marks and a reference photocell, said reference photocell being aligned with said first axis thereby providing an indication of said first axis when said laser beam traverses said reference photocell.

51. The method of claim 50, wherein said reference photocell includes a first position in a path of said laser beam and a second position out of said path of said laser beam.

52. The method of claim 47, wherein said rotary encoder comprises a read head and a rotary disk having a plurality of holes.

53. The method of claim 45, wherein said step of determining said alignment direction with respect to one of said first axis and said second axis comprises the step of transmitting an electromagnetic wave from said target to said laser source indicating detection of said laser beam in said alignment direction.

54. The method of claim 53, wherein said step of determining said alignment direction with respect to one of said first axis and said second axis comprises the step of using a rotary encoder to determine said alignment direction in response to said electromagnetic wave.

55. The method of claim 45, wherein said step of calculating a first calculated slope and a second calculated slope based on said alignment direction, said first slope and said second slope comprises the step of determining an angle θ between said first axis and said alignment direction.

56. The method of claim 55, wherein said step of calculating a first calculated slope and a second calculated slope based on said alignment direction, said first slope and said second slope comprises the step of determining an angle φ between said first axis and an equivalent first axis based on said alignment direction as follows:

$$\phi = \theta \quad \text{if } 330° \leq \theta \leq 30°;$$
$$\phi = \theta - 90° \quad \text{if } 60° \leq \theta \leq 120°;$$
$$\phi = \theta - 180° \quad \text{if } 150° \leq \theta \leq 210°; \text{ and}$$
$$\phi = \theta - 270° \quad \text{if } 240° \leq \theta \leq 330°.$$

57. The method of claim 56, wherein said step of calculating a first calculated slope and a second calculated slope based on said alignment direction, said first slope and said second slope comprises the step of calculating said first calculated slope and said second calculated slope using the following equations:

$$m = m' \cos(\phi) - n' \sin(\phi);$$

and $$n = n' \cos(\phi) + m' \sin(\phi)$$

where:
- m is the first calculated slope;
- n is the second calculated slope;
- m' is the first slope;
- n' is the second slope; and
- φ is the angle between said first axis and said equivalent first axis.

58. The method of claim 55, wherein said step of calculating a first calculated slope and a second calculated slope based on said alignment direction, said first slope and said second slope comprises the step of calculating said first calculated slope and said second calculated slope using the following equations:

$$m = m' \cos(\phi) - n' \sin(\phi);$$

and $$n = n' \cos(\phi) + m' \sin(\phi)$$

where:
- m is the first calculated slope;
- n is the second calculated slope;
- m' is the first slope;
- n' is the second slope; and
- φ is an angle between said first axis and an said equivalent first axis based on said angle θ.

59. The method of claim 45, wherein said first slope is a compound slope and wherein said alignment direction is a direction of said compound slope.

60. The method of claim 45, further comprising the step of providing an indication that said alignment direction has been determined.

61. The method of claim 60, wherein said step of providing an indication that said alignment direction has been determined comprises the step of turning said laser beam off.

62. The method of claim 61, wherein said step of turning said laser beam off comprises the step of turning said laser beam off momentarily.

63. The method of claim 45, wherein said first axis comprises a positive first axis and a negative first axis, and wherein said second axis comprises a positive second axis and a negative second axis.

64. The method of claim 45, wherein said first axis is substantially orthogonal to said second axis.

65. The method of claim 45, wherein said step of determining said alignment direction with respect to one of said first axis and said second axis is performed a plurality of times and averaged.

* * * * *